Figure 1:
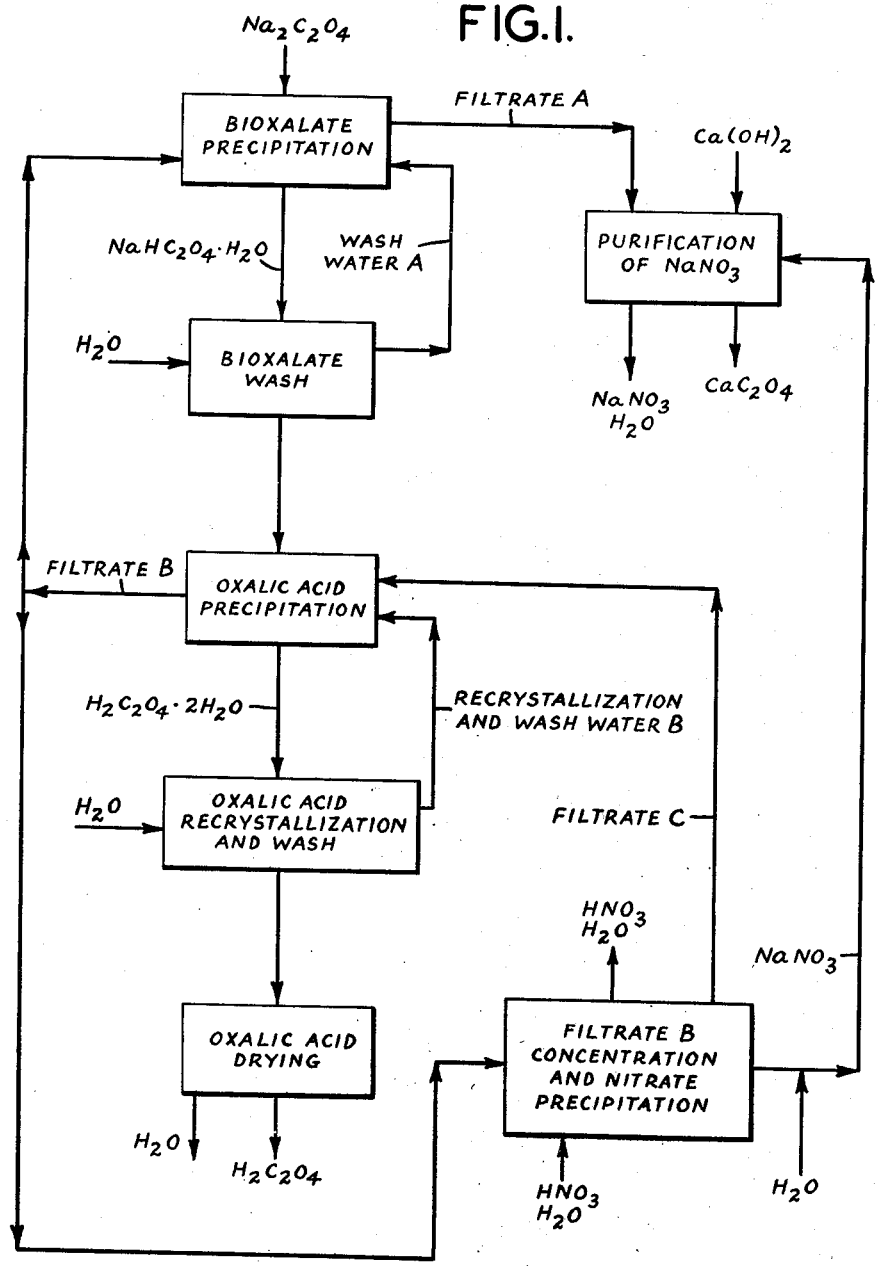

Patented Aug. 24, 1954

2,687,433

UNITED STATES PATENT OFFICE 2,687,433

MANUFACTURE OF OXALIC ACID

Leland J. Beckham, Bermuda District, Chesterfield County, Va., assignor to Allied Chemical & Dye Corporation, New York, N. Y., a corporation of New York Application December 29, 1951, Serial No. 264,129

2 Claims. (Cl. 260—538)

This invention relates to the manufacture of oxalic acid. More specifically, it relates to the manufacture of oxalic acid from alkali metal oxalates by reaction with nitric acid.

Oxalic acid may be prepared on the commercial scale from sodium oxalate in the following manner. The sodium oxalate is treated with milk of lime to give calcium oxalate together with dilute sodium hydroxide. In order to convert the calcium oxalate to oxalic acid, sulfuric acid is employed to produce a water-insoluble calcium sulfate which can be readily separated from the oxalic acid. This process possesses the disadvantage of employing an expensive raw material, sulfuric acid, which gives a by-product, calcium sulfate, having practically no resale value.

Oxalic acid is also obtained by oxidation of carbohydrates such as cane sugar, glucose, other sugars or mixtures thereof, starch, dextrin, etc., with nitric acid. An important disadvantage of this reaction, however, is that it is exceedingly difficult to control, producing side reactions and, accordingly, resulting in low yields.

To my knowledge no commercially successful process for obtaining oxalic acid by reaction of alkali metal oxalates with nitric acid has been developed prior to my invention. It is, accordingly, an object of this invention to provide a practicable and economical process for the manufacture of oxalic acid by reaction of alkali metal oxalates with nitric acid. Another object is to provide a process for the conversion of alkali metal oxalates to oxalic acid in which the nitric acid employed is converted to a nitrate product having good market value. Other objects and advantages of my invention will be apparent from the following description of the invention.

In accordance with the broadest aspect of my invention, oxalic acid is prepared by employing a process in which (1) an alkali metal oxalate is treated in solution with nitric acid to form an alkali metal bioxalate, and (2) the resultant alkali metal bioxalate is then treated in solution with additional nitric acid to form oxalic acid dihydrate. If desired, the oxalic acid dihydrate may be conveniently dried to produce anhydrous oxalic acid. By-product alkali metal nitrate is also formed during each of the above reactions and may be advantageously and readily recovered from the mother liquors remaining after separation of alkali metal bioxalate and oxalic acid dihydrate.

The reactions involved in the conversion of sodium oxalate to oxalic acid dihydrate, for example, may be represented by the following equations:

(1) $Na_2C_2O_4 + HNO_3 + H_2O \rightarrow$
$NaNO_3 + NaHC_2O_4.H_2O$ (2) $NaHC_2O_4.H_2O + HNO_3 + H_2O \rightarrow$
$NaNO_3 + H_2C_2O_4.2H_2O$ In practice of my invention, to achieve maximum or near maximum recovery of high purity oxalic acid and alkali metal nitrate, I have found it desirable in effecting the reaction between the alkali metal oxalate and nitric acid to employ a quantity of nitric acid which is stoichiometrically equivalent or approximately so to the alkali metal oxalate. When sodium oxalate, for example, is used, excessive quantities of nitric acid result in premature formation of oxalic acid dihydrate which is substantially more water-soluble than the desired intermediate product, sodium bioxalate monohydrate, and may, at least in part, be removed from the system with sodium nitrate. Such removal normally represents loss of yield of oxalic acid product and added cost of recovery of sodium nitrate.

I have also found that the temperature of the reaction is most favorably maintained in the range of 15° to 65° C. Reaction temperatures higher than about 65° C. tend to produce undesirable oxidized by-products or loss of yield of desired product.

Also, I have found that in the interest of efficient operation and economical recovery of high yields of oxalic acid and alkali metal nitrate, it is desirable to employ a quantity of water in the separation, as by filtration, decantation or otherwise, of the bioxalate precipitate-mother liquor system which results in recovery of bioxalate containing alkali metal nitrate as impurity in appreciable but relatively small amount. Such water may be present in the nitric acid or may be added subsequently, if it is desired to use relatively concentrated nitric acid.

As may be understood, the quantity of water necessary to achieve the above result is subject to variation with differences in nature of starting materials and separation temperatures, which are appropriately in the range of 15° to 35° C. I have found that excessive quantities of water during separation and any washing steps subsequent thereto may result in maintaining substantial amounts of alkali metal bioxalate in solution which would increase expense of recovering the alkali metal nitrate therefrom as well as reducing ultimate yield of oxalic acid product.

For preferred separation temperature of about 25° C. in the water-sodium oxalate-nitric acid-sodium bioxalate monohydrate system, I have found that a water content of at least 35% by weight is adequate for efficient separation. It is preferred, however, that in a cyclic process such as described below, somewhat higher dilution be employed, as about 40% by weight water content or higher.

With respect to the conversion of alkali metal bioxalate to oxalic acid dihydrate, it is important that the quantity of nitric acid present be substantially in excess of the theoretical stoichiometric equivalency of the acid to bioxalate as expressed in the above Equation 2. If only such equivalency be used, the resultant product includes unconsumed bioxalate which is separable from oxalic acid dihydrate only at the expense of burdensome, expensive procedure and of substantial loss of yield of desired final oxalic acid product. The amount of nitric acid employed thus must be sufficient to produce an aqueous reaction mixture within which the degree of acidity is sufficiently high that substantially no bioxalate ion may exist therein. Specific proportions of nitric acid necessary to achieve the proper reaction medium will vary to some extent with difference in nature of starting material as well as reaction conditions obtaining, including temperature and concentration.

Presence of impurities in the reaction mixture for the second stage of my process as preferably conducted, including the minor proportion of alkali metal nitrate normally present in the bioxalate intermediate, tends to increase the quantity of nitric acid necessary. However, if the reaction mixture for producing the oxalic acid dihydrate contains oxalic acid in addition to alkali metal nitrate, as is the case when nitric acid-containing liquor derived from the oxalic acid dihydrate formation step is recirculated to that step in accordance with the cyclic process described below, the oxalic acid tends to counteract the effect of nitrate with respect to requirement for nitric acid. In fact, with preferred recirculation procedure the requirement for nitric acid may be approximately the minimum or only slightly greater than that required if neither alkali metal nitrate nor oxalic acid were present in the reaction mixture.

Reaction temperature in this stage of my process is desirably maintained in the range of 15° to 65° C. Often, however, a temperature in the upper part of this range may be required to effect solution of solid reactants.

If the alkali metal bioxalate in my process be sodium bioxalate monohydrate, for example, I have found that the quantity of nitric acid necessary under typical reaction temperature of 15° to 65° C. is such that will provide at least about 3.2 mols of hydrogen ion for each mol of oxalate ion present in the final acid reaction mixture. If, however, the bioxalate monohydrate be impure, as in the cyclic process described below, containing say up to 10% sodium nitrate after limited water washing of the precipitate separated from mother liquor, nitric acid may be required in amount sufficient to provide up to or above 4.0 mols of hydrogen ion for each mol of oxalate ion.

As in the first reaction of my process, it is desirable for efficient and economical operation that a quantity of water be employed in the separation of the oxalic acid dihydrate precipitate-mother liquor system which results in recovery of oxalic acid dihydrate containing alkali metal nitrate as impurity in appreciable but relatively small amount. Again, such water may be present in the reactant nitric acid or may be added subsequently if relatively concentrated nitric acid is employed.

As in the bioxalate separation step of my process, the quantity of water desirably employed during segregation of oxalic acid dihydrate from other substances present in the reaction system is subject to variation with differences in nature of starting materials and separation temperatures, which are suitably in the range of 15° to 35° C. Too much water, of course, may dissolve appreciable quantities of relatively water-soluble oxalic acid dihydrate, and hence tend to decrease ultimate yield of final oxalic acid product.

For preferred separation temperature of about 25° C. in the water-sodium bioxalate monohydrate-nitric acid-oxalic acid dihydrate system, I have found that a water content of at least 47% by weight is adequate for efficient separation.

The nitric acid employed in either stage of my process is suitably of 35% to 65% concentration by weight. The lower ranges may provide sufficient water to dissolve substantially all of the alkali metal nitrate formed, if so desired, while the upper ranges will require the use of additional water for such effect.

The oxalic acid dihydrate formed in my process may be conveniently purified by conventional recrystallization and washing, and then be converted into anhydrous oxalic acid by heating at about 95° to 100° C.

The by-product alkali metal nitrate present in mother and wash liquors from the separation steps of my process may be purified by addition of sufficient calcium hydroxide to obtain precipitation of oxalate ions present as insoluble calcium oxalate. A small amount of sodium hydroxide may be required to adjust the acidity of the above solution, to be followed, if desired, by evaporation to recover solid nitrate or concentrated solutions thereof. Production of alkali metal nitrate which has a ready market in the fertilizer trade, for example, constitutes a distinct advantge over other methods for making oxalic acid.

In practice of a preferred and specific method embraced within the scope of my invention, at least part of the reactant solutions containing nitric acid employed in the steps of producing alkali metal bioxalate and oxalic acid dihydrate, respectively, is supplied by mother liquor remaining after separation of the oxalic acid dihydrate. Solution employed for the preparation of the alkali metal bioxalate may also contain wash water obtained by washing the bioxalate, while solution used for preparation of the oxalic acid dihydrate may contain recrystallization and wash waters obtained in purification of the oxalic acid dihydrate.

When there is such circulation of mother liquor, it is preferred, in order to reject alkali metal nitrate as precipitate and at the same time to avoid accumulation of dilute mother liquor or of bioxalate, especially before use in the oxalic acid dihydrate preparation step, to subject the liquor to concentration, as by partial evaporation. If nitric acid is added to the liquor prior to the partial evaporation, the concentration step results in more effective rejection as precipitate of a portion of the alkali metal nitrate present while producing liquor of the degree of acidity desired for the preparation of oxalic acid dihydrate. Alkali metal nitrate separated as precipitate during the concentration step may be subjected to purification with similar nitrate present in mother liquor remaining after separation of the bioxalate.

In converting sodium oxalate, for example to oxalic acid dihydrate in accordance with the embodiment of my invention described above:

A. Sodium oxalate is treated with a portion of the mother liquor containing approximately a stoichiometric amount of HNO$_3$ from step B to form sodium bioxalate monohydrate. The bioxalate is filtered from the mother liquor containing largely dissolved sodium nitrate and is then washed with water to reduce the sodium nitrate content in the product to a low value, preferably 5% to 10% by weight or less.

B. The washed bioxalate monohydrate containing sodium nitrate is treated with mother liquor from step C, said liquor containing HNO$_3$ in amount sufficient to consume substantially all of the bioxalate ion and to provide at least about 3.2 mols of hydrogen ion, preferably about 3.2 to 4.0 mols of hydrogen ion, for each mol of oxalate present in the final acid reaction mixture, thereby forming oxalic acid dihydrate. The dihydrate is filtered from the mother liquor which is recycled for use in steps A and C.

C. A portion of the mother liquor from step B is vacuum evaporated, with added HNO$_3$, if desired or required, to precipitate NaNO$_3$ and form a liquor suitable for use in step B of the following cycle.

The oxalic acid dihydrate formed in step B may be conveniently purified and converted into anhydrous oxalic acid as described above. Likewise, the sodium nitrate formed in steps A and C may be purified in the manner described above.

The procedure involved in the preferred modification of my process may be more clearly understood from the following specific example taken in connection with Fig. 1 showing a flow diagram of the process. In the example parts are by weight.

A reactor is charged at about 25° C. with about 3135 parts of sodium oxalate, about 1704 parts of wash water designated as "Wash water A" and about 5630 parts of recycled solution designated as "Filtrate B," approximately a stoichiometric amount of nitric acid with respect to the sodium oxalate being present in the reaction mixture. The water content of the reaction mixture is about 4295 parts (41% by weight). The mixture forms a slurry which is stirred to obtain good mixing. An exothermic reaction occurs, the temperature of the mixture rising within a few minutes to about 55° C., forming sodium bioxalate monohydrate and sodium nitrate. After the maximum reaction temperature is reached, the mixture is cooled to 25° C. and filtered. The filtrate, containing largely dissolved sodium nitrate and designated as "Filtrate A," constitutes about 5554 parts and is purified, as later described, for recovery of the sodium nitrate. The residue from the filtration constituting about 4915 parts is then washed with about 1062 parts of H$_2$O at 25° C. The wash water that results, designated as "Wash water A," is used in the bioxalate precipitation step of the succeeding cycle.

The washed crude bioxalate constituting about 4273 parts and containing about 2882 parts of NaHC$_2$O$_4$ (as monohydrate), about 243 parts of sodium nitrate and about 91 parts of unreacted sodium oxalate is then charged to a reactor with about 5974 parts of liquors designated as "Recrystallization and wash water B" and about 9642 parts of recycle solution designated as "Filtrate C," the mol quantity of hydrogen ion being about 3.5 times that of oxalate ion present in the final acid reaction mixture. The water content of the reaction mixture is about 9633 parts (about 48% by weight). The mixture is heated to about 55° C. to dissolve solids.

The solution is then cooled to about 25° C., and oxalic acid dihydrate is precipitated slowly over a period of about 15 minutes. The dihydrate is separated from the mother liquors by vacuum filtration, and the filtrate designated as "Filtrate B" and constituting about 15,876 parts is recycled in the process. The residue constituting about 4,013 parts is dissolved in about 3,814 parts H$_2$O at about 90° C. The resulting solution is cooled to 25° C. and oxalic acid dihydrate precipitates. The recrystallization liquors are removed by vacuum filtration, and the oxalic acid is washed with about 1,038 parts of water at 25° C. The wet filter cake constitutes about 2,890 parts containing about 2,000 parts of H$_2$C$_2$O$_4$ (as dihydrate) and about 1 part of NaNO$_3$. The recrystallization and washing liquors designated as "Recrystallization and wash water B" are employed in the oxalic acid precipitation step of the succeeding cycle.

A portion of "Filtrate B" is recycled for use in the bioxalate precipitation step as described above. The remaining "Filtrate B" is mixed with make-up nitric acid and concentrated by vacuum evaporation to precipitate some sodium nitrate and furnish the recycled liquor designated as "Filtrate C," suitable for use in the oxalic acid precipitation step. In carrying out the concentration operation, a batch still is charged with about 10,245 parts of "Filtrate B" and about 9,071 parts of nitric acid having a concentration of about 65%. The still charge is heated to about 45° to 50° C. and evaporated at about 25 mm. mercury pressure until about 5,170 parts of water together with about 2,948 parts of nitric acid are removed in the overhead. When distillation has stopped, the concentrated residue is cooled to 25° C. and precipitated sodium nitrate is removed by vacuum filtration. The filtrate designated as "Filtrate C" constitutes about 9,642 parts. The residue from the filtration constitutes about 1,558 parts containing about 1,478 parts of NaNO$_3$ and about 55 parts of H$_2$C$_2$O$_4$ (as dihydrate) and is purified, as later described, for recovery of the sodium nitrate.

The wet filter cake of the recrystallized and washed oxalic acid dihydrate is converted to the anhydrous acid by heating at 95° to 100° C. for about 2 hours. The oxalic acid so produced, constituting about 2,000 parts, represents a yield of about 95% of the theory based on the sodium oxalate reacted and contains less than 0.1% sodium nitrate.

The crude sodium nitrate obtained from concentrating "Filtrate B" is dissolved in about 1,230 parts of water and mixed with "Filtrate A," the mother liquor from the bioxalate precipitation step. About 87 parts of calcium hydroxide are added to the resulting solution to precipitate the oxalate ions as insoluble calcium oxalate. A small amount of sodium hydroxide, if required, is added to adjust the acidity of the solution. The calcium oxalate constituting about 150 parts is filtered off, and the filtrate contains about 3,975 parts of sodium nitrate in about 4,304 parts of water. The sodium nitrate product represents a yield of about 99% of theory based on the nitric acid consumed and is practically free from oxalates.

The process may, if desired, be carried out not only as a batch process as described above but also by a continuous process or by any other suitable process.

Since certain changes may be made in carrying out the above method without departing from the scope of the invention, it is intended that all matter contained in the above description shall be interpreted as illustrative and not in a limiting sense.

Figure 2:
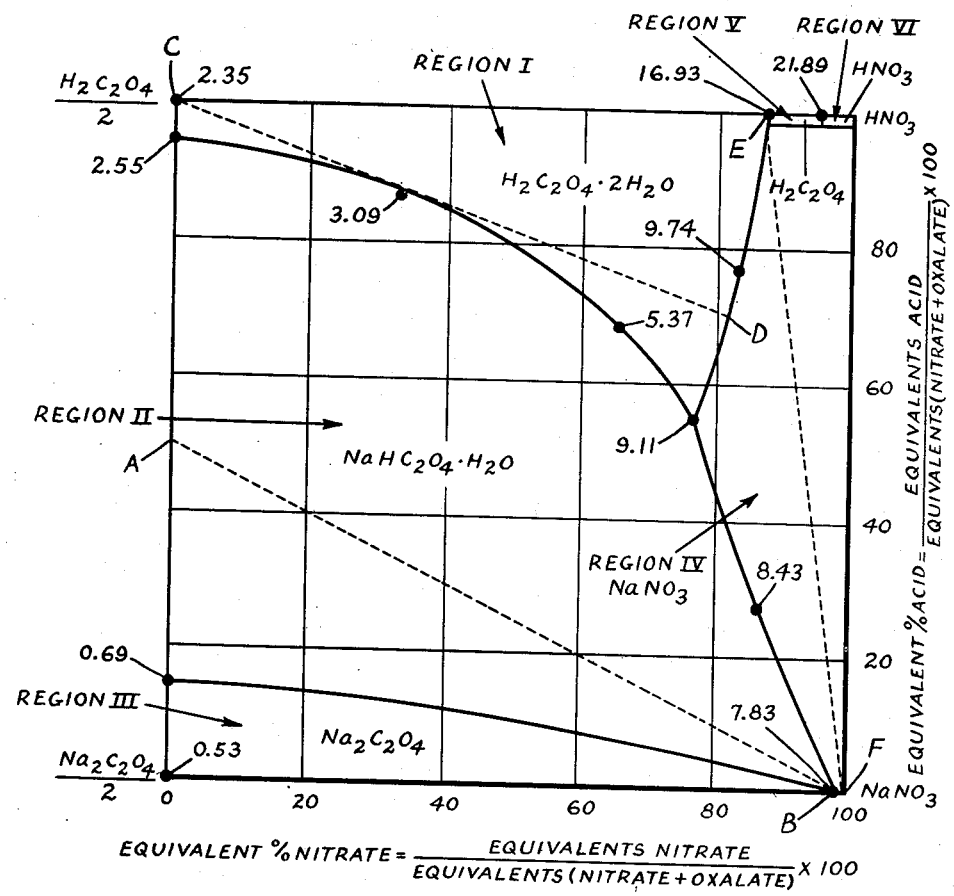

In carrying out the process of my invention, for purposes of economy and with view to securing ease of control while obtaining high yields of pure oxalic acid and alkali metal nitrate, I prefer to use sodium oxalate as my starting material. When sodium oxalate is employed, the conditions for effective operation of my process are far less critical than when potassium oxalate, for example, is employed. In using sodium oxalate as my starting material, suitable proportions of reactants to form the desired products, are apparent from the phase diagram illustrated in Fig. 2. This diagram represents a Janecke type phase diagram in terms of equivalent percent nitrate and equivalent percent acid of the reciprocal-pair, 4-component water-containing system: $H_2O$—$NaNO_3$—$Na_2C_2O_4$—$H_2C_2O_4(HNO_3)$ at about 25° C. The Janecke type phase diagram permits water to be eliminated from the diagram by the device of assuming that a shadow is cast from a point of light situated at the apex of the pyramid. The regions I, II, III, IV and V of the diagram represent solutions saturated with respect to $H_2C_2O_4.2H_2O$, $NaHC_2O_4.H_2O$, $Na_2C_2O_4$, $NaNO_3$ and $H_2C_2O_4$, respectively; region VI, high in $HNO_3$ content, cannot be saturated with a solid phase. The values shown at representative points on the diagram give concentrations of solids in the saturated solutions expressed as equivalents of nitrate+oxalate per liter of solution.

In accordance with the phase diagram,

$NaHC_2O_4.H_2O$ will be the first material to precipitate from a saturated solution at about 25° C. when the solids composition of said solution falls within region II of the phase diagram. In a corresponding manner, $H_2C_2O_4.2H_2O$ can be precipitated from a saturated solution whose solids composition falls within region I and $NaNO_3$ can be precipitated from a saturated solution in region IV of the diagram. Preferred solids composition for a saturated solution to precipitate $NaHC_2O_4.H_2O$ falls approximately on dotted line A—B within region II of the phase diagram; preferred solids composition for a saturated solution to precipitate $H_2C_2O_4.2H_2O$ falls approximately on dotted line C—D within region I of the diagram; and preferred solids composition for a saturated solution to precipitate $NaNO_3$ falls approximately on dotted line E—F within region IV of the diagram.

A suitable phase diagram may also be tabulated for the system $H_2O$—$KNO_3$—$K_2C_2O_4$—$H_2C_2O_4(HNO_3)$ However, I have found that regions in which the potassium bioxalate and oxalic acid dihydrate are present as a solid, for example, at separation temperature of about 25° C., are considerably smaller than those of the corresponding sodium system. This is due to the presence of a large region in which potassium tetraoxalate dihydrate is formed. Thus, when the potassium system is used, there is greater possibility of high loss of yield or purity or both of oxalic acid and potassium nitrate.

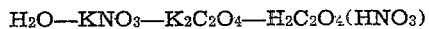

I claim:
1. A cyclic process for producing oxalic acid from sodium oxalate which comprises reacting sodium oxalate at temperature within the range of 15°–65° C. in an aqueous medium with approximately a stoichiometric amount of nitric acid contained within a mother liquor hereinafter described to produce sodium bioxalate monohydrate and sodium nitrate, separating said sodium bioxalate monohydrate as solid from said aqueous medium, reacting the separated sodium bioxalate monohydrate at temperature within the range of 15°–65° C. with nitric acid in an aqueous menstruum hereinafter described to produce oxalic acid dihydrate and additional sodium nitrate, said aqueous menstruum providing about 3.2 to 4 mols of hydrogen ion to each mol of oxalate ion therein, separating said oxalic acid dihydrate as solid from said aqueous menstruum to provide the aforesaid mother liquor, returning such portion of said mother liquor as contains a quantity of nitric acid approximately stoichiometrically equivalent to said sodium oxalate for reaction therewith, subjecting the balance of the mother liquor to concentration to effect precipitation of sodium nitrate therefrom, separating precipitated sodium nitrate from the concentrated liquor, and bringing together said separated sodium bioxalate monohydrate, said separated concentrated liquor and added nitric acid to provide the aforesaid aqueous menstruum.

2. A cyclic process for producing oxalic acid from sodium oxalate which comprises reacting sodium oxalate at temperature within the range of 15°–65° C. in an aqueous medium with approximately a stoichiometric amount of nitric acid contained within a mother liquor hereinafter described to produce sodium bioxalate monohydrate and sodium nitrate, separating said sodium bioxalate monohydrate as solid from said aqueous medium, reacting the separated sodium bioxalate monohydrate at temperature within the range of 15°–65° C. with nitric acid in an aqueous menstruum hereinafter described to produce oxalic acid dihydrate and additional sodium nitrate, said aqueous menstruum providing about 3.2 to 4 mols of hydrogen ion to each mol of oxalate ion therein separating said oxalic acid dihydate as solid from said aqueous menstruum to provide the aforesaid mother liquor, returning such portion of said mother liquor as contains a quantity of nitric acid approximately stoichiometrically equivalent to said sodium oxalate for reaction therewith, adding nitric acid to the balance of the mother liquor to have present in said liquor sufficient nitric acid for reaction with said sodium bioxalate monohydrate, subjecting said mother liquor to concentrtaion to effect precipitation of sodium nitrate therefrom, separating precipitated sodium nitrate from the concentrated liquor, and bringing together said separated sodium bioxalate monohydrate and said separated concentrated liquor to provide the aforesaid aqueous menstruum.

References Cited in the file of this patent

UNITED STATES PATENTS

| Number | Name | Date |
|---|---|---|
| 1,031,074 | Lidbury | July 2, 1912 |
| 1,509,575 | Young | Sept. 23, 1924 |

FOREIGN PATENTS

| Number | Country | Date |
|---|---|---|
| 172,385 | Canada | Oct. 10, 1916 |